US007027256B1

(12) United States Patent
Subrahmanyam et al.

(10) Patent No.: US 7,027,256 B1
(45) Date of Patent: Apr. 11, 2006

(54) DISK DRIVE HAVING SERVO SECTORS THAT STORE REPEATABLE RUNOUT CORRECTION VALUES AND RELATED ERROR CORRECTION CODE DATA

(75) Inventors: Jai N. Subrahmanyam, Santa Clara, CA (US); Jack M. Chue, Los Altos, CA (US); Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 155 days.

(21) Appl. No.: 10/377,078

(22) Filed: Feb. 28, 2003

(51) Int. Cl.
*G11B 5/596* (2006.01)

(52) U.S. Cl. ................................ 360/77.08; 360/77.04

(58) Field of Classification Search .. 360/77.01–77.08, 360/48, 75, 78.14, 51, 53
See application file for complete search history.

(56) References Cited

U.S. PATENT DOCUMENTS 3,871,003 A * 3/1975 Kondo et al. ............... 347/142
4,689,792 A * 8/1987 Traynor ...................... 714/753
5,825,578 A 10/1998 Shrinkle et al.
5,832,005 A * 11/1998 Singh ......................... 714/805
6,141,175 A 10/2000 Nazarian et al.
6,493,173 B1 * 12/2002 Kim et al. ............... 360/77.04
6,671,119 B1 * 12/2003 Baumann et al. ........ 360/77.08

* cited by examiner

*Primary Examiner*—David Hudspeth
*Assistant Examiner*—Jason Olson
(74) *Attorney, Agent, or Firm*—Robroy R. Fawcett, Esq.; Jonathan E. Prejean, Esq.

(57) ABSTRACT

A magnetic disk drive having a reduction in repeatable runout (RRO) effects is disclosed. The disk drive has a head disk assembly (HDA) and a sampled servo controller. The HDA includes a rotating magnetic disk, an actuator, and a transducer head. The magnetic disk has a plurality of embedded servo sectors for storing servo information including repeatable runout (RRO) cancellation values and RRO cancellation value error correction code (ECC) data at a servo data rate. The RRO cancellation value ECC data is only for detecting and correcting errors in the RRO cancellation values. In between the embedded servo sectors are data sectors for storing user data at a user data rate that is different from the servo data rate. The actuator positions the transducer head in response to a control effort signal generated by the sampled servo controller based on the servo information.

20 Claims, 8 Drawing Sheets

IDEAL SERVO TRACKS

WRITTEN SERVO TRACKS

DISK DRIVE HAVING SERVO SECTORS THAT STORE REPEATABLE RUNOUT CORRECTION VALUES AND RELATED ERROR CORRECTION CODE DATA

BACKGROUND OF THE INVENTION

1. Field of the Invention

The present invention relates to rotating magnetic disk drives, and more particularly, to a method for more reliably reducing the effects of repeatable runout in the location of embedded servo sectors relative to a concentric track center.

2. Description of the Prior Art and Related Information

Repeatable runout (RRO) in a disk drive results from imperfections, with respect to a perfect circle, in the location of servo information along a track on a disk surface in the disk drive. Due to disk spindle rotation, the servo imperfections due to RRO are periodic having a fundamental frequency that is equal to the spindle rotation frequency. The RRO imperfections are relatively static over time and the effects of the RRO may be attenuated by measuring the RRO and storing RRO cancellation values for later use in a head-position servo loop to compensate for the RRO effects.

Accordingly, there exists a need for a technique for reliably storing the RRO cancellation values for significantly reducing the effects of RRO.

SUMMARY OF THE INVENTION

The present invention may be embodied in a magnetic disk drive having a reduction in repeatable runout (RRO) effects. The disk drive has a head disk assembly (HDA) and a sampled servo controller. The HDA includes a rotating magnetic disk, an actuator, and a transducer head. The magnetic disk has distributed position information in a plurality of uniformly spaced-apart embedded servo sectors for defining data storage tracks. The plurality of embedded servo sectors store servo information including repeatable runout (RRO) cancellation values and RRO cancellation value error correction code (ECC) data at a servo data rate. The RRO cancellation value ECC data is only for detecting and correcting errors in the RRO cancellation values. Each data storage track has a plurality of data sectors between the embedded servo sectors for storing user data at a user data rate that is different from the servo data rate. The actuator positions the transducer head in response to a control effort signal. The transducer head is for periodically reading the distributed position information from the servo sectors, and for reading data from the storage tracks. The sampled servo controller periodically adjusts the control effort signal during a track-following operation based on the distributed position information and the RRO cancellation values.

In more detailed features of the invention, each servo sector may store an RRO cancellation value and corresponding ECC data. Alternatively, the servo sectors of a data storage track may comprise a repeating series of first type servo sectors and second type servo sectors. The first type servo sectors may store RRO cancellation values and not ECC data, and the second type servo sectors may store ECC data and not RRO cancellation values. Alternatively, the first type servo sectors may store RRO cancellation values and not ECC data, and the second type servo sectors may store RRO cancellation values and ECC data. Also, the first type servo sectors may store RRO cancellation values and ECC data, and the second type servo sectors may not store RRO cancellation values or ECC data.

In other more detailed features of the invention, the servo sectors of a data storage track may comprise a repeating series of first type servo sectors, second type servo sectors, and third type servo sectors. The first and third type servo sectors may store RRO cancellation values and ECC data, and the second type servo sectors may not store RRO cancellation values or ECC data.

Alternatively, the present invention may be embodied in a related method for using repeatable runout (RRO) cancellation values and RRO cancellation value error correction code (ECC) data stored in the servo sectors. In the method, at least one RRO cancellation value related to a predetermined track is read during track following. RRO cancellation value ECC data is read that corresponds to each read RRO cancellation value. Each read RRO cancellation value is monitored for errors using the corresponding ECC data.

In more detailed features of the invention, an error in a read RRO cancellation value may be corrected if detected. Also, the sampled servo controller may periodically adjust the control effort signal based on the distributed position information and the monitored and corrected RRO cancellation value(s) to reduce, during track following, effects of RRO in the distributed position information.

Another alternative embodiment of the invention may reside in a data structure for storing information in an embedded servo sector of a rotating disk medium of a disk drive. The data structure may include a track identification field, a RRO cancellation value field, and an RRO cancellation value error correction code (ECC) field.

In other more detailed features of the invention, the FCC data stored in the RRO cancellation value ECC field may be based on a (14, 8) Hamming code. The (14, 8) Hamming code may consist of two (7, 4) Hamming codes. Alternatively, the ECC data stored in the RRO cancellation value FCC field may be based on a (16, 12) Hamming code, a (24, 12) Golay code, a Reed-Solomon code, or a Reed-Muller code.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
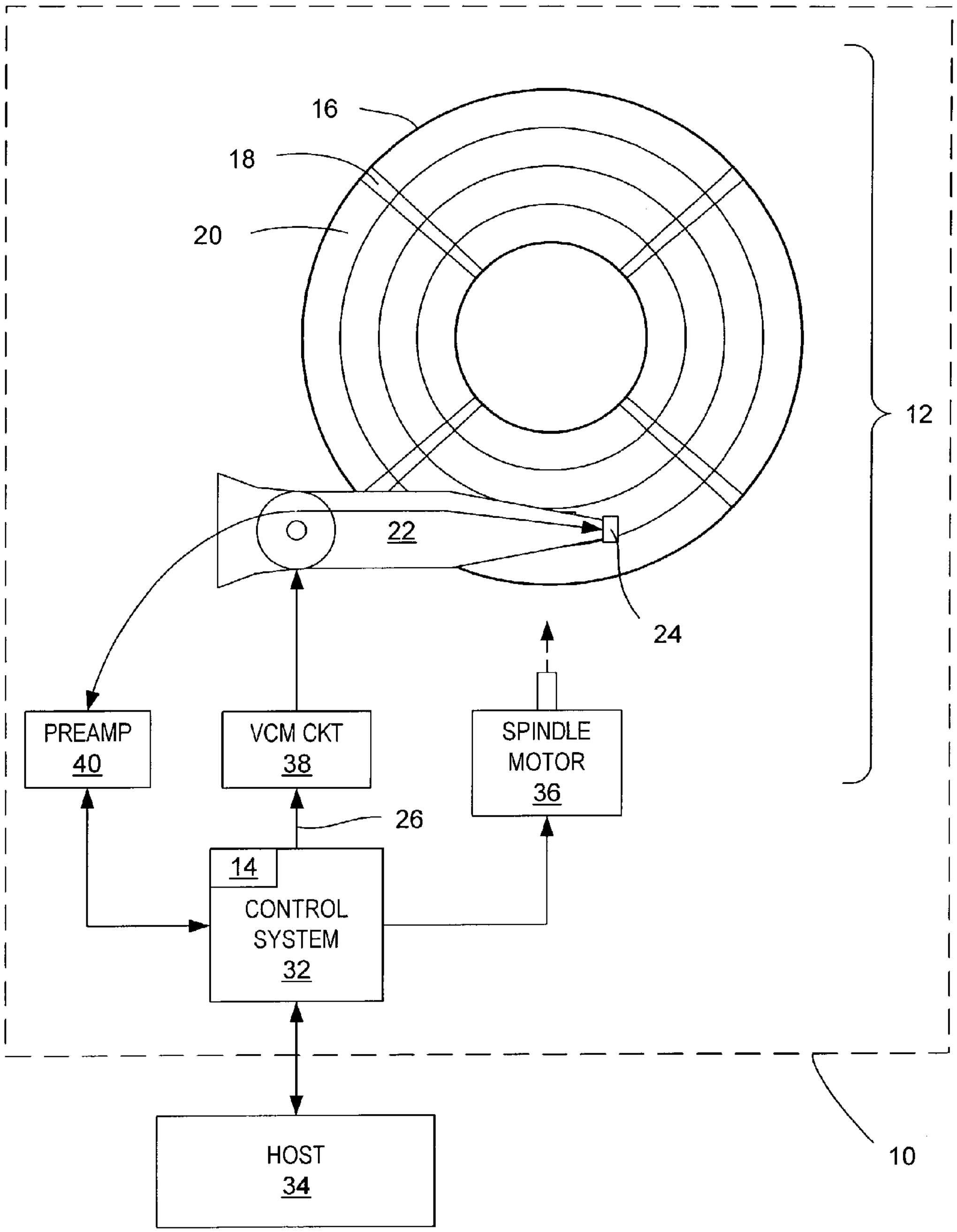
FIG. 1 is a block diagram of a disk drive having reduced repeatable runout (RRO) effects using RRO cancellation values and FCC data stored in embedded servo sectors, according to the present invention.
Figure 2:
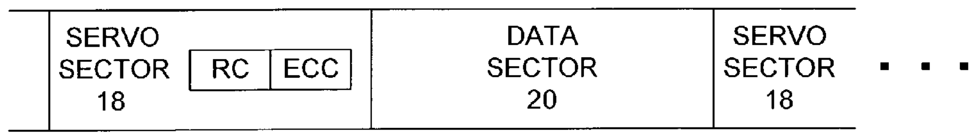
FIG. 2 is a schematic diagram of a data storage track segment having an embedded servo sector for storing RRO cancellation values and ECC data, and having a data sector, according to the present invention.

With reference to FIGS. 1 and 2, the present invention may be embodied in a magnetic disk drive 10 having a reduction in repeatable runout (RRO) effects. The disk drive has a head disk assembly (HDA) 12 and a sampled servo controller 14. The HDA includes a rotating magnetic disk 16, an actuator 22, and a transducer head 24. The magnetic disk has distributed position information in a plurality of uniformly spaced-apart embedded servo sectors 18 for defining data storage tracks. The plurality of embedded servo sectors store servo information including repeatable runout (RRO) cancellation values RC and RRO cancellation value error correction code (ECC) data at a servo data rate. The RRO cancellation value ECC data is only for detecting and correcting errors in the RRO cancellation values. Each data storage track has a plurality of data sectors 20 between the embedded servo sectors for storing user data at a user data rate that is different from the servo data rate. The actuator positions the transducer head in response to a control effort signal 26. The transducer head is for periodically reading the distributed position information from the servo sectors, and for reading data from the storage tracks. The sampled servo controller periodically adjusts the control effort signal during a track-following operation based on the distributed position information and the RRO cancellation values.

Figure 3A:
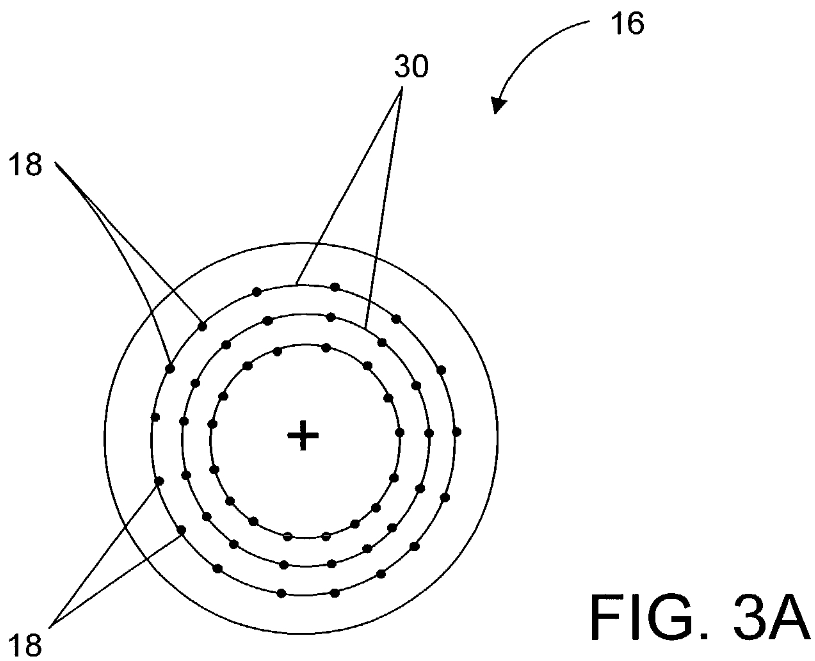
FIG. 3A is a schematic diagram illustrating ideal servo tracks on a disk of a disk drive.
Figure 3B:
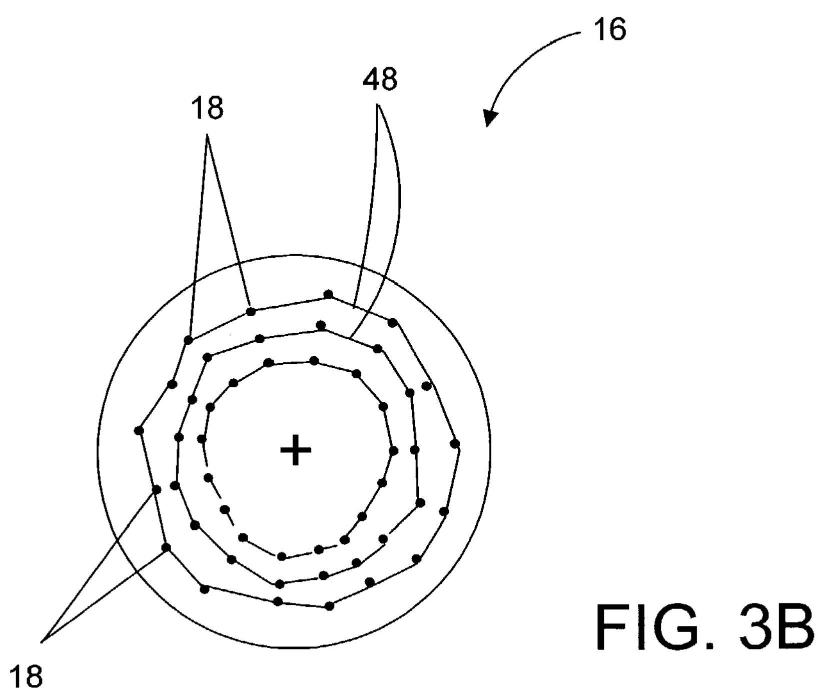
FIG. 3B is a schematic diagram illustrating written servo tracks exhibiting servo RRO.

The use of the RRO cancellation value ECC code data allows for the reliable storage of the RRO cancellation values RC in the servo sectors 18. The RRO imperfections in the servo sector position information may constitute nearly 50% of total position error signal (PES) variance in a disk drive 10 having high track pitch. Cancellation of the RRO is desired to improve drive performance and achieve higher track densities. An ideal track 30 is one that forms a perfect circle on the disk 16 as shown in FIG. 3A. During manufacture, the embedded servo sectors 18 are placed on the disk during a servo writing operation. The servo sectors 18 include servo bursts that are placed at locations that may deviate outwardly or inwardly from the ideal "center line" of the track circle as shown in FIG. 3B. These apparent deviations from the ideal track center line can occur due to spindle runout, vibrations or movements during servo writing operation, and media defects or noise in the region of the servo bursts. High capacity disk drives also have more sensitive transducer heads 24 which are susceptible to head instability. The head instability may result in bit errors. Using an RRO cancellation value having a bit error may be more detrimental to immediate disk drive performance than the original RRO effects.

Figure 4:
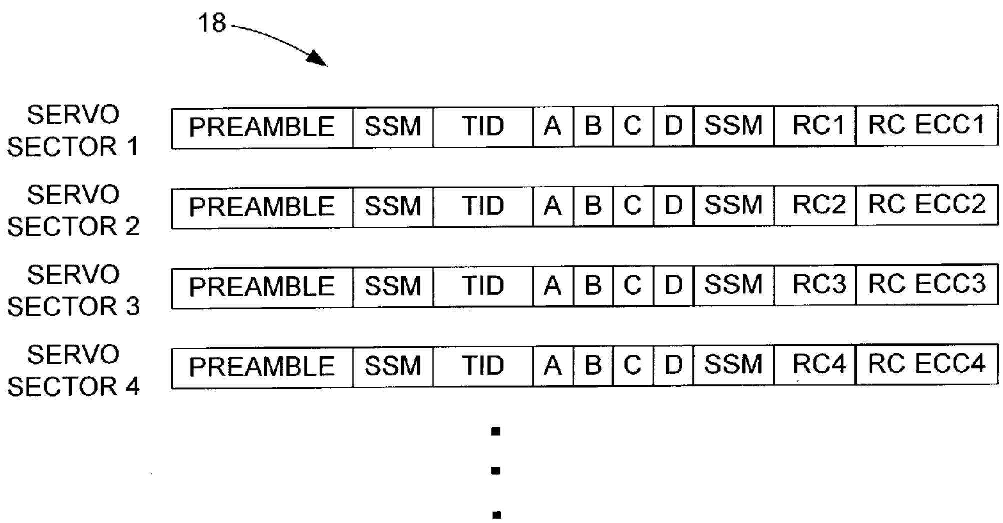
FIG. 4 is a schematic diagram of servo sectors for storing RRO cancellation values and FCC data in a first format.
Figure 5:
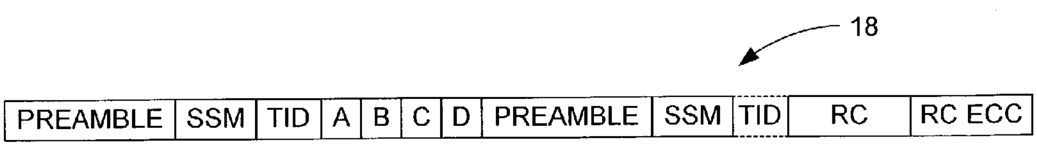
FIG. 5 is a schematic diagram of servo sectors for storing RRO cancellation values and FCC data in a second format.
Figure 6:
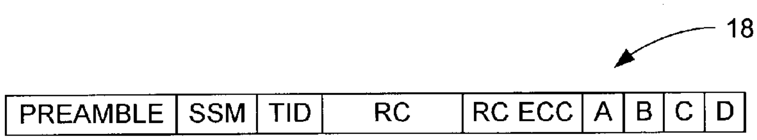
FIG. 6 is a schematic diagram of servo sectors for storing RRO cancellation values and FCC data in a third format.
Figure 7:
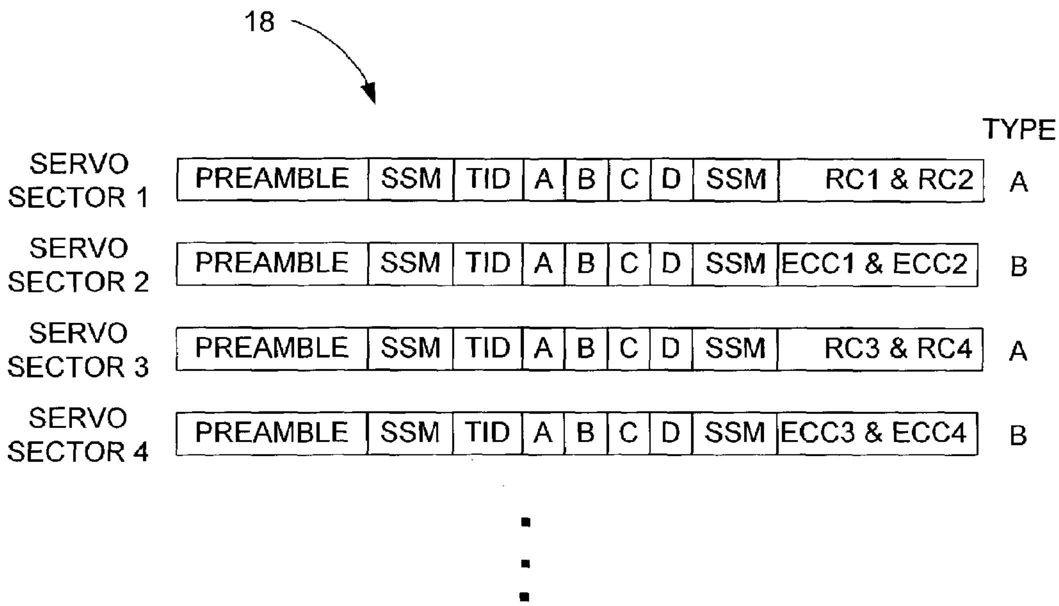
FIG. 7 is a schematic diagram of servo sectors for storing RRO cancellation values and FCC data in a fourth format.

With reference to FIGS. 4 through 9, the servo sector 18 may store the RRO cancellation values RC and the ECC data in data structures having a variety of formats. Each servo sector has a preamble field, a servo sync mark (SSM) field, a track identification (TID) number field, and servo bursts, A, B, C and D, for determining the position of the transducer head 24 with respect to a track. In one format, each servo sector may have additional fields for storing an RRO cancellation value and corresponding ECC data (FIG. 4). Also, a separate preamble field, optionally with another track identification number field, may be provided immediately preceding the fields for the RRO cancellation value and the ECC data (FIG. 5). Alternatively, the additional fields for the RRO cancellation value and the ECC data may be provided after the track identification field and before the servo bursts (FIG. 6). In another format, the servo sectors of a data storage track may comprise a repeating series of first type servo sectors A and second type servo sectors B (FIG. 7). The first type servo sectors may store RRO cancellation values and not ECC data, and the second type servo sectors may store ECC data and not RRO cancellation values. Alternatively, the first type servo sectors may store RRO cancellation values and not ECC data, and the second type servo sectors may store RRO cancellation values and ECC data. Also, the first type servo sectors may store RRO cancellation values and ECC data, and the second type servo sectors may not store RRO cancellation values or ECC data.

Figure 8:
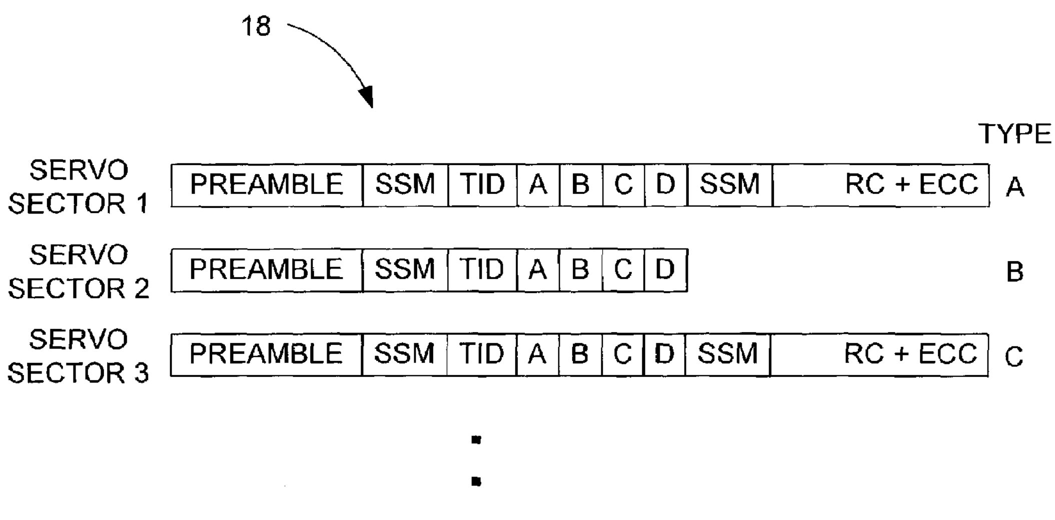
FIG. 8 is a schematic diagram of servo sectors for storing RRO cancellation values and FCC data in a fifth format.
Figure 9:
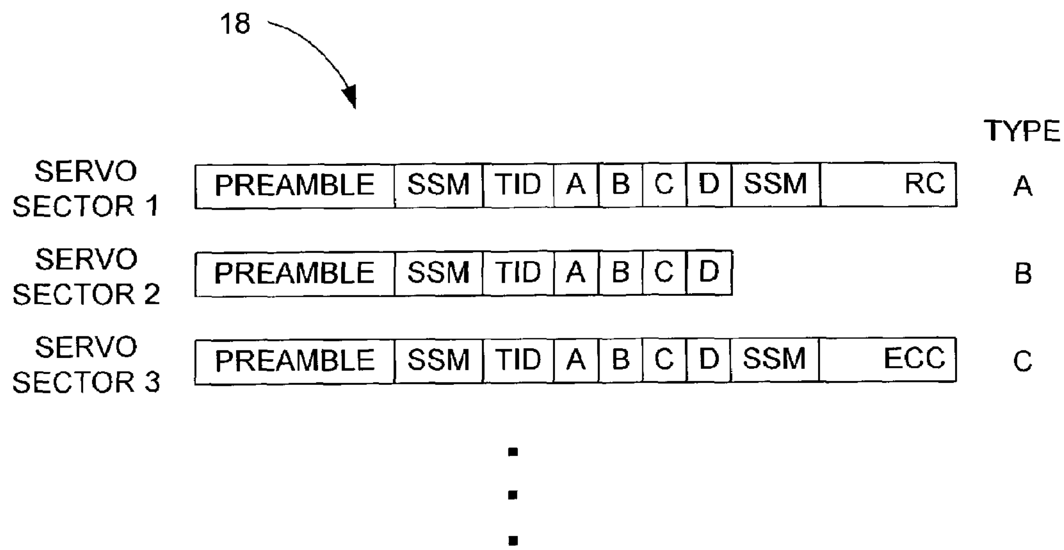
FIG. 9 is a schematic diagram of servo sectors for storing RRO cancellation values and FCC data in a sixth format.

In yet another format, the servo sectors 18 of a data storage track may comprise a repeating series of first type servo sectors A, second type servo sectors B, and third type servo sectors C. The first and third type servo sectors may store RRO cancellation values and ECC data, and the second type servo sectors may not store RRO cancellation values or ECC data (FIG. 8). Alternatively, the first type servo sectors may store RRO cancellation values, the second type servo sectors may not store RRO cancellation values or ECC data, and the third type servo sectors may store ECC data (FIG. 9). Generally, RRO cancellation fields and corresponding ECC data fields in servo sectors which are positioned after the burst fields may desirably be immediately preceded by a suitable mark such as a SSM, as shown, for delimiting the RRO/ECC data fields.

Figure 10:
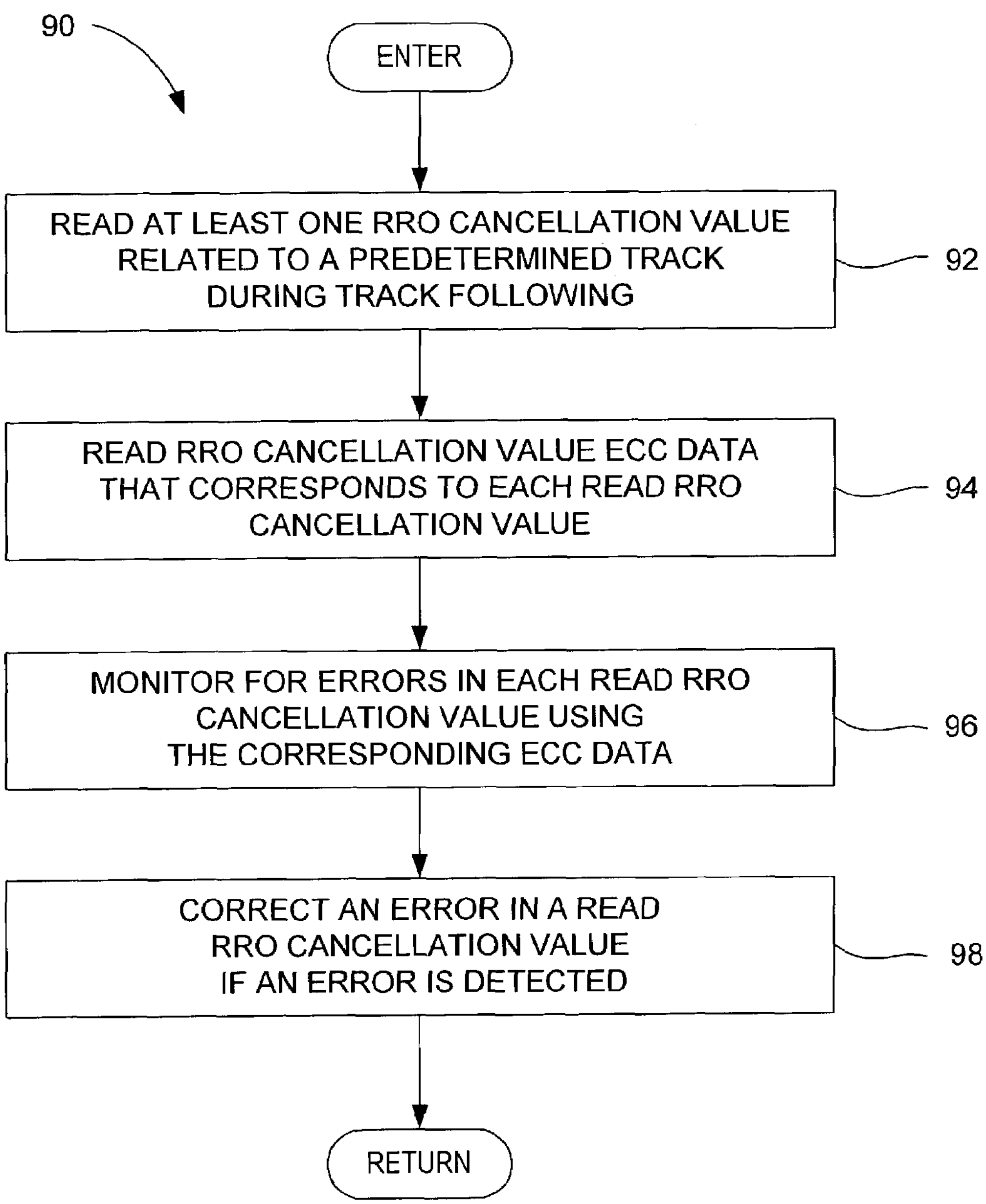
FIG. 10 is a block diagram showing a method for using RRO cancellation values and ECC data stored in embedded servo sectors, according to the present invention.

With reference to FIG. 10, the present invention also may be embodied in a related method 90 for using repeatable runout (RRO) cancellation values RC and RRO cancellation value error correction code (ECC) data stored in the servo sectors. In the method, at least one RRO cancellation value related to a predetermined track is read during track following (step 92). RRO cancellation value ECC data is read that corresponds to each read RRO cancellation value (step 94). Each read RRO cancellation value is monitored for errors using the corresponding ECC data (step 96). An error in a read RRO cancellation value may be corrected if detected (step 98).

The sampled servo controller may periodically adjust the control effort signal based on the distributed position information and the monitored and corrected RRO cancellation value(s) to reduce, during track following, effects of RRO in the distributed position information.

With reference again to FIG. 1, the disk drive further has a control system 32. The control system includes the sampled servo controller 14, and circuitry and processors that control a head-disk assembly (HDA) 12 and that provide an intelligent interface between a host 34 and the HDA for execution of read and write commands. The control system may have an internal microprocessor and nonvolatile memory for implementing the techniques related to the invention. Program code for implementing these techniques may be stored in the nonvolatile memory and transferred to volatile random access memory (RAM) for execution by the microprocessor. The HDA further includes a spindle motor 36, at least one disk 16, the actuator 22, a voice coil motor (VCM) circuit 38 coupled between the actuator and the sampled servo controller of the control system, and a preamplifier 40 coupled between the transducer head 24 and the control system.

The magnetic media surface of the disk 16 is accessed using the head 24. The tracks 20 on the media surface may be divided into the storage segments. Each storage segment typically begins with a servo sector which is followed by data sectors. The servo sector for a storage segment corresponds to an intersection with the radially-extending embedded servo wedges 18. The data sectors may include data blocks, each generally storing 512 data bytes. Each data block may be addressed using a logical block address (LBA).

Figure 11:
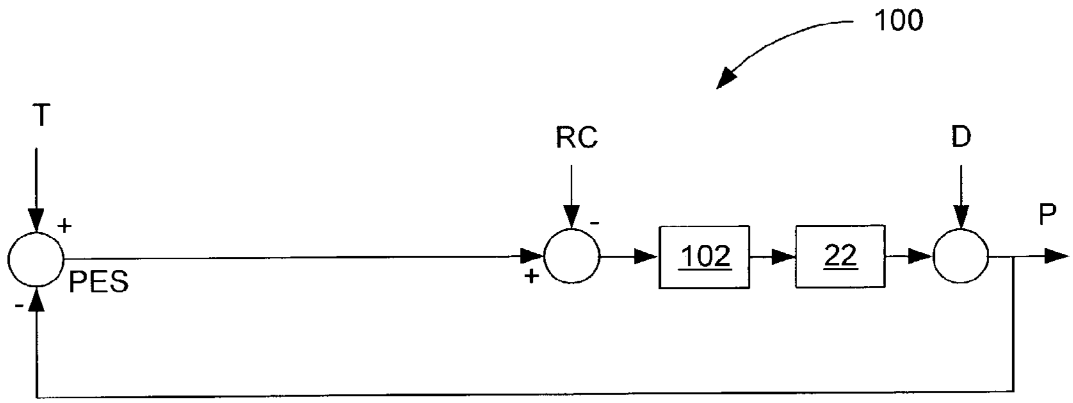
FIG. 11 is a block diagram of a servo control loop, within the disk drive of FIG. 1, for using the RRO values to reduce the effects of RRO during track following operations.

With reference to FIG. 11, a servo control loop 100, implemented by the sampled servo controller 14, includes the actuator 22 after a track following compensator 102. Disturbances D to the actuator alter the resulting head position P. A track selection signal T is compared to the head position P to generate a position error signal PES. For track following during disk operations, the RRO cancellation values RC modify the PES to reduce the effect of the RRO.

Figure 12:
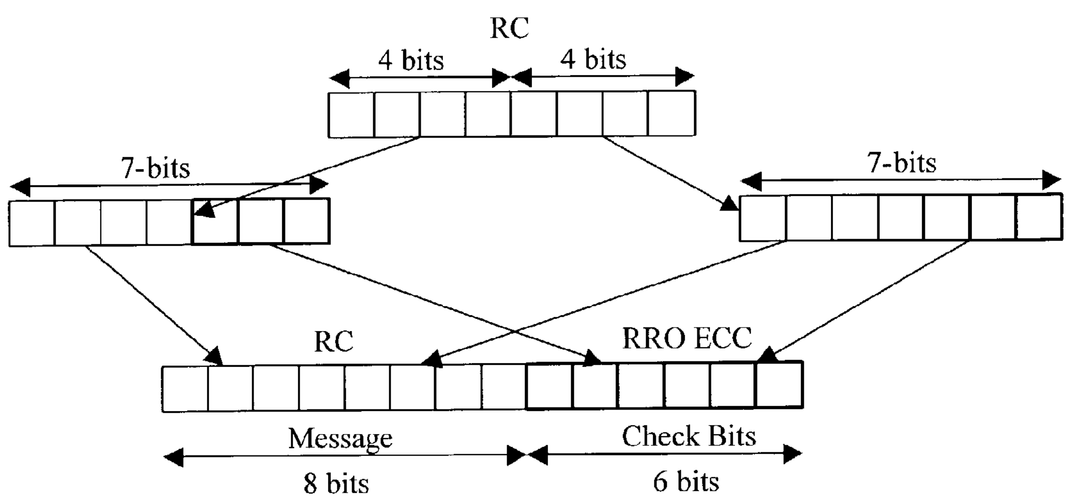
FIG. 12 is a schematic diagram of a data structure for storing the RRO cancellation values and ECC data.
Figure 13:
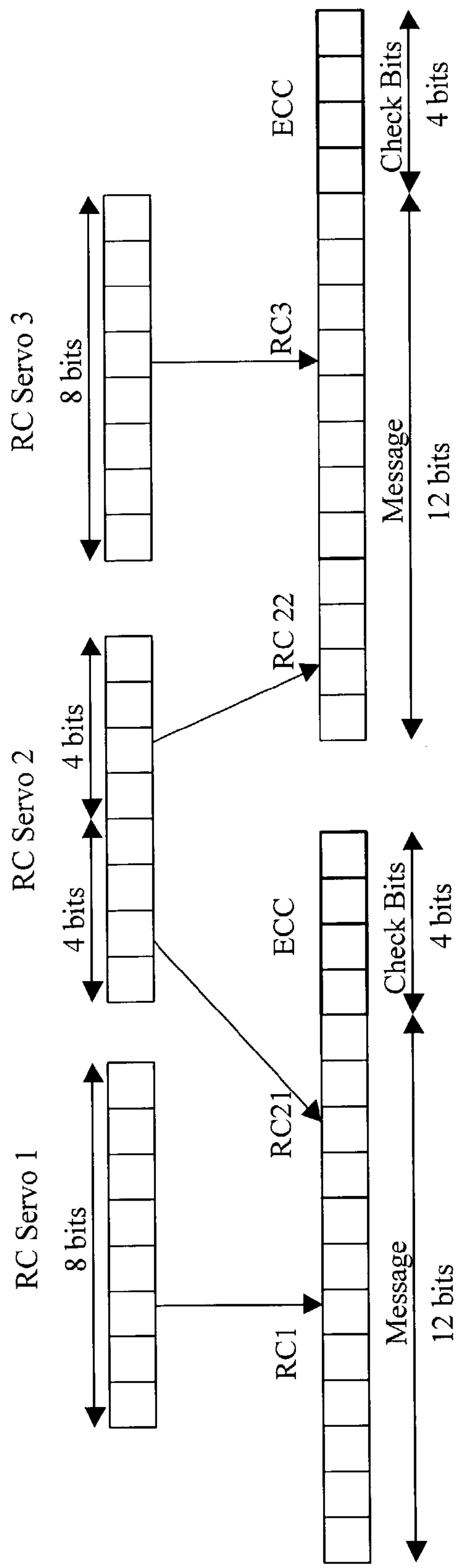
FIG. 13 is a schematic diagram of first and second data structures for storing three RRO cancellation values and related ECC data.

Advantageously, the ECC data stored in the RRO cancellation value ECC field may be based on a (14, 8) Hamming code. The (14, 8) Hamming code may consist oftwo (7, 4) Hamming codes, as shown in FIG. 12. Alternatively, the ECC data stored in the RRO cancellation value ECC field may be based on a (16, 12) Hamming code. As shown in FIG. 13, three RRO cancellation values RC may be encoded in two (16, 12) Hamming codes by splitting the second RRO cancellation value. The two (16, 12) Hamming code results may be stored in the format shown in FIG. 8. Also, the ECC data stored in the RRO cancellation value ECC field may be based on a (24, 12) Golay code. The Hamming and Golay codes are particularly suitable for detecting head instability induced errors. Other codes may be used to protect the RRO cancellation value fields such as Reed-Solomon and Reed-Muller. The decoding of the error correction codes may be performed using lookup tables, Meggitt decoders, or algebraic techniques implemented in hardware or software using standard algorithms.

What is claimed is:

1. A magnetic disk drive having a reduction in repeatable runout (RRO) effects, comprising:

a head disk assembly (HDA) including a rotating magnetic disk having distributed position information in a plurality of uniformly spaced-apart embedded servo sectors for defining data storage tracks, the plurality of embedded servo sectors for storing servo information including repeatable runout (RRO) cancellation values and RRO cancellation value error correction code (ECC) data at a servo data rate, the RRO cancellation value ECC data only for detecting and correcting errors in the RRO cancellation values, and each data storage track having a plurality of data sectors between the embedded servo sectors for storing user data at a user data rate that is different from the servo data rate, an actuator for positioning a transducer head in response to a control effort signal, the transducer head for periodically reading the distributed position information from the servo sectors and reading data from the data storage tracks; and a sampled servo controller for periodically adjusting the control effort signal during a track-following operation based on the distributed position information and the RRO cancellation values.

2. A magnetic disk drive as defined in claim 1, wherein each servo sector stores an RRO cancellation value and corresponding ECC data.

3. A magnetic disk drive as defined in claim 1, wherein the servo sectors of a data storage track comprise a repeating series of first type servo sectors and second type servo sectors.

4. A magnetic disk drive as defined in claim 3, where the first type servo sectors store RRO cancellation values and not ECC data, and the second type servo sectors store ECC data and not RRO cancellation values.

5. A magnetic disk drive as defined in claim 3, where the first type servo sectors store RRO cancellation values and not ECC data, and the second type servo sectors store RRO cancellation values and ECC data.

6. A magnetic disk drive as defined in claim 3, where the first type servo sectors store RRO cancellation values and ECC data, and the second type servo sectors do not store RRO cancellation values or ECC data.

7. A magnetic disk drive as defined in claim 1, wherein the servo sectors of a data storage track comprise a repeating series of first type servo sectors, second type servo sectors, and third type servo sectors.

8. A magnetic disk drive as defined in claim 7, where the first and third type servo sectors store RRO cancellation values and ECC data, and the second type servo sectors do not store RRO cancellation values or ECC data.

9. In a magnetic disk drive having a head disk assembly (HDA) and a sampled servo controller, the HDA including a rotating magnetic disk and an actuator, the magnetic disk having distributed position information in a plurality of uniformly spaced-apart embedded servo sectors for defining data storage tracks, the plurality of embedded servo sectors for storing servo information including repeatable runout (RRO) cancellation values and RRO cancellation value error correction code (ECC) data at a servo data rate, the RRO cancellation value ECC data only for detecting and correcting errors in the RRO cancellation values, each data storage track having a plurality of data sectors between the embedded servo sectors for storing user data at a user data rate that is different from the servo data rate, the actuator for positioning a transducer head in response to a control effort signal, the transducer head for periodically reading the distributed position information from the servo wedges and reading data from the storage tracks, the sampled servo controller for periodically adjusting the control effort signal during a track-following operation based on the distributed position information and the RRO cancellation values; a method for using repeatable runout (RRO) cancellation values and RRO cancellation value error correction code (ECC) data stored in the servo sectors, comprising the steps of:

reading at least one RRO cancellation value, stored in the embedded servo sector(s), related to a predetermined track during track following;

reading RRO cancellation value ECC data, stored in the embedded servo sector(s), corresponding to each read RRO cancellation value; and monitoring for errors in each read RRO cancellation value using the corresponding ECC data.

10. A method for using RRO cancellation value ECC data as defined in claim 9, further comprising correcting an error in a read RRO cancellation value if an error is detected.

11. A method for using RRO cancellation value ECC data as defined in claim 9, wherein the sampled servo controller periodically adjusts the control effort signal based on the distributed position information and the monitored and corrected RRO cancellation value(s) to reduce, during track following, effects of RRO in the distributed position information.

12. A method for using RRO cancellation value ECC data as defined in claim 9, wherein each servo sector stores an RRO cancellation value and corresponding ECC data.

13. A method for using RRO cancellation value ECC data as defined in claim 9, wherein the servo sectors of a data storage track comprise a repeating series of first type servo sectors and second type servo sectors.

14. A method for using RRO cancellation value ECC data as defined in claim 13, where the first type servo sectors store RRO cancellation values and not ECC data, and the second type servo sectors store ECC data and not RRO cancellation values.

15. A method for using RRO cancellation value ECC data as defined in claim 13, where the first type servo sectors store RRO cancellation values and not ECC data, and the second type servo sectors store RRO cancellation values and ECC data.

16. A method for using RRO cancellation value ECC data as defined in claim 13, where the first type servo sectors store RRO cancellation values and ECC data, and the second type servo sectors do not store RRO cancellation values or ECC data.

17. A method for using RRO cancellation value ECC data as defined in claim 9, wherein the servo sectors of a data storage track comprise a repeating series of first type servo sectors, second type servo sectors, and third type servo sectors.

18. A method for using RRO cancellation value ECC data as defined in claim 17, where the first and third type servo sectors store RRO cancellation values and ECC data, and the second type servo sectors do not store RRO cancellation values or ECC data.

19. An embedded servo sector of a rotating disk medium of a disk drive, comprising:

a track identification field;

a repeatable runout (RRO) cancellation value field; and an RRO cancellation value error correction code (ECC) field for detecting and correcting errors only in the RRO cancellation values, wherein ECC data stored in the RRO cancellation value ECC field is based on a code selected from the group consisting of: a (14, 8) Hamming code, a (16, 12) Hamming code, a (24, 12) code, a Reed-Solomon code, and a Reed-Muller code.

20. An embedded servo sector as defined in claim 19, wherein the selected code comprises a (14,8) Hamming code and the (14, 8) Hamming code consists of two (7, 4) Hamming codes.

* * * * *